United States Patent
Rathay et al.

(10) Patent No.: US 11,105,511 B2
(45) Date of Patent: Aug. 31, 2021

(54) ROTATING DETONATION PROPULSION SYSTEM

(71) Applicant: General Electric Company, Schenectady, NY (US)

(72) Inventors: Nicholas William Rathay, Rock City Falls, NY (US); Narendra Digamber Joshi, Schenectady, NY (US); Venkat Eswarlu Tangirala, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 192 days.

(21) Appl. No.: 16/220,783

(22) Filed: Dec. 14, 2018

(65) Prior Publication Data

US 2020/0191399 A1     Jun. 18, 2020

(51) Int. Cl.
| | |
|---|---|
| *F23R 7/00* | (2006.01) |
| *B64C 23/04* | (2006.01) |
| *F02C 5/02* | (2006.01) |
| *B64D 27/02* | (2006.01) |
| *B64C 3/32* | (2006.01) |
| *B64C 9/38* | (2006.01) |

(52) U.S. Cl.
CPC ............... *F23R 7/00* (2013.01); *B64C 3/32* (2013.01); *B64C 23/04* (2013.01); *B64D 27/02* (2013.01); *F02C 5/02* (2013.01); *B64C 9/38* (2013.01)

(58) Field of Classification Search
CPC .. F23R 7/00; B64C 3/32; B64C 23/04; B64D 27/02
See application file for complete search history.

(56) References Cited

U.S. PATENT DOCUMENTS

| | | | |
|---|---|---|---|
| 3,168,997 A * | 2/1965 | Saunders | B64C 23/005 244/12.1 |
| 3,240,010 A | 3/1966 | Morrison et al. | |
| 3,584,811 A | 6/1971 | Bramhall et al. | |
| 3,971,209 A | 7/1976 | de Chair | |
| 5,522,217 A | 6/1996 | Zauner | |
| 6,112,512 A | 9/2000 | Miller et al. | |
| 6,439,503 B1 * | 8/2002 | Winfree | F02K 7/075 244/53 R |
| 6,442,930 B1 | 9/2002 | Johnson et al. | |
| 6,526,936 B2 | 3/2003 | Nalim | |
| 6,550,235 B2 | 4/2003 | Johnson et al. | |
| 6,883,302 B2 | 4/2005 | Koshoffer | |
| 6,926,231 B2 | 8/2005 | Ouellette et al. | |
| 7,198,234 B2 | 4/2007 | Saddoughi | |
| 8,683,780 B2 | 4/2014 | Shimo et al. | |
| 8,887,482 B1 | 11/2014 | Ruggeri et al. | |
| 8,931,518 B2 | 1/2015 | Whalen | |
| 9,816,463 B2 | 11/2017 | Falempin et al. | |

(Continued)

*Primary Examiner* — Justin M Benedik
(74) *Attorney, Agent, or Firm* — Venable LLP; Jacqueline A. DiRamio; Michele V. Frank

(57) ABSTRACT

A propulsion system includes at least one rotating detonation actuator comprising: a flow path extending from an inlet end to an outlet end; an inner wall defining a radially inner boundary of the flow path; an outer wall defining a radially outer boundary of the flow path; and at least one aircraft wing. The rotating detonation actuator is disposed in the aircraft wing. At least one rotating detonation wave travels through the flow path from the inlet end to the outlet end.

8 Claims, 12 Drawing Sheets

(56) References Cited

U.S. PATENT DOCUMENTS

| | | | |
|---|---|---|---|
| 2006/0000943 A1* | 1/2006 | Ouellette | B64C 9/38 244/35 R |
| 2013/0336781 A1* | 12/2013 | Rolt | B64C 9/16 415/208.1 |
| 2018/0010800 A1 | 1/2018 | Nagesh | |
| 2018/0179953 A1 | 6/2018 | Tangirala et al. | |
| 2018/0180289 A1 | 6/2018 | Lavertu, Jr. et al. | |
| 2018/0231256 A1 | 8/2018 | Pal et al. | |

* cited by examiner

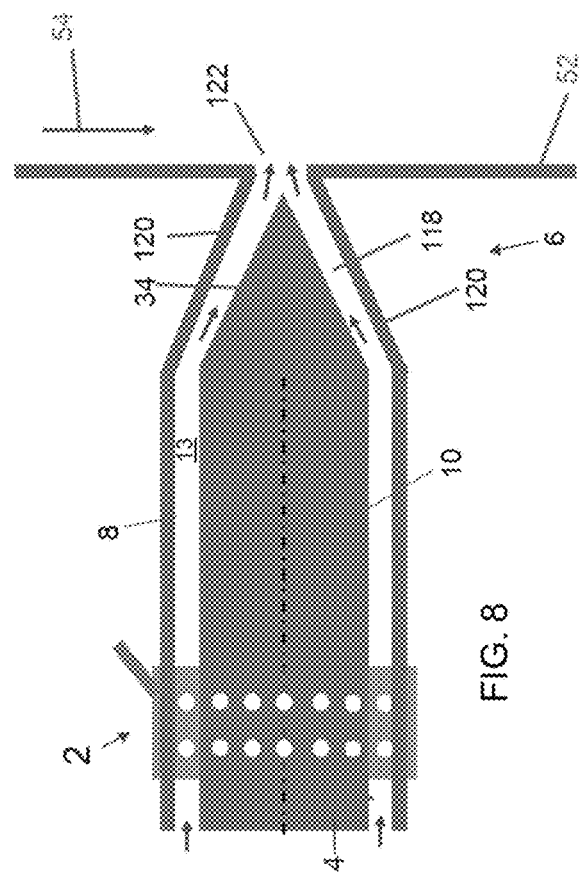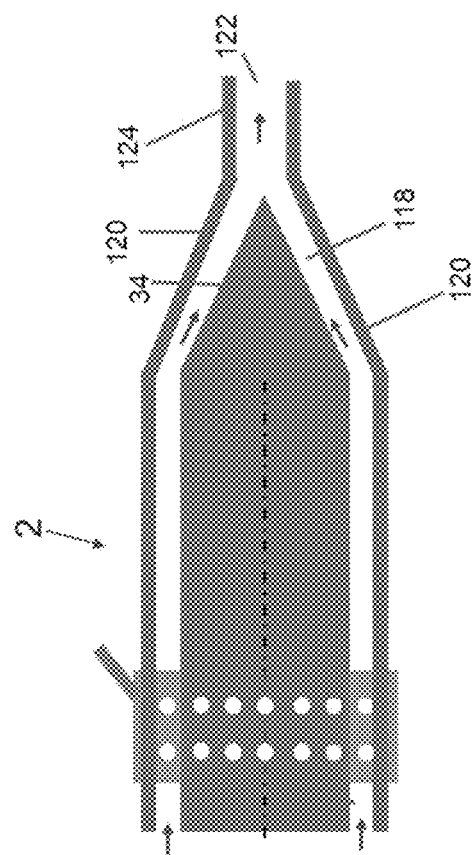

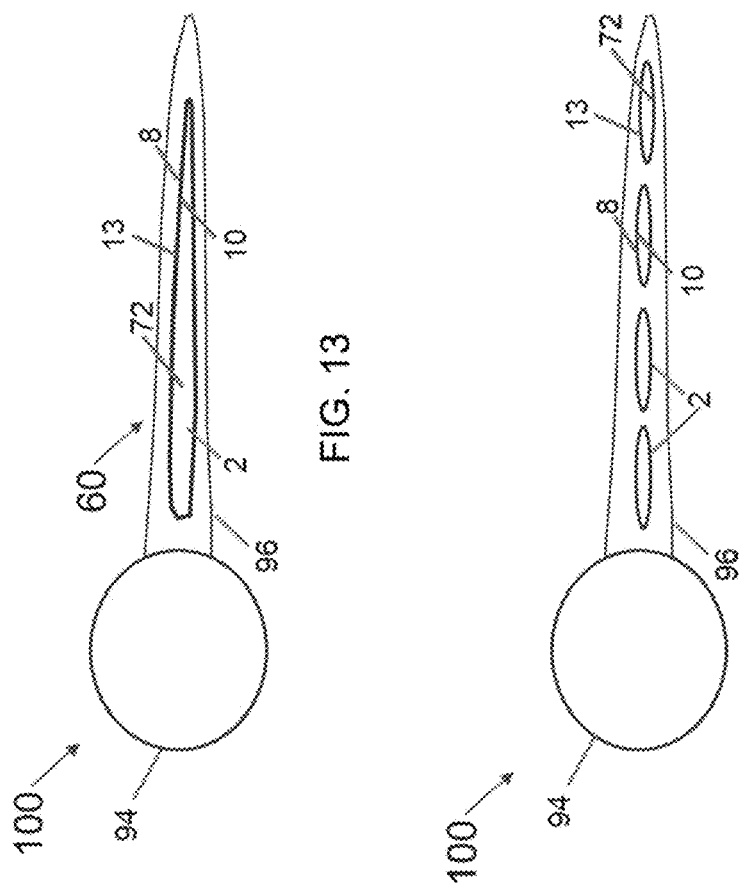
FIG. 13
FIG. 14
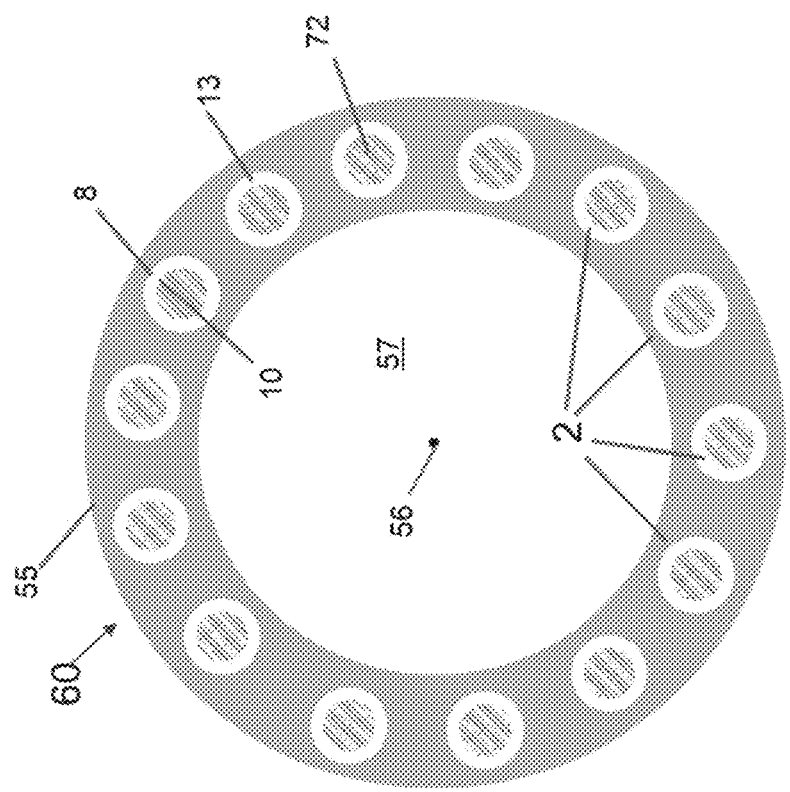
FIG. 12

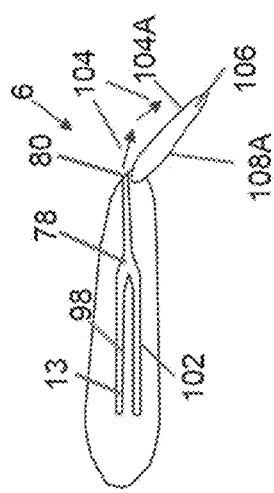
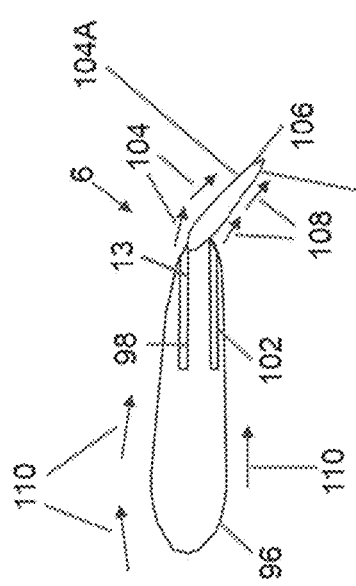
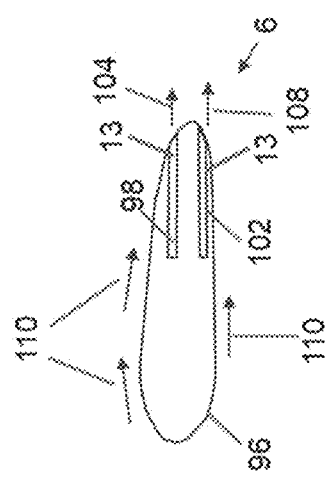

ROTATING DETONATION PROPULSION SYSTEM

BACKGROUND

The present subject matter relates generally to an actuator, such as a rotating detonation actuator, and flow control systems employing a rotating detonation actuator.

Rotating detonation actuators, combustors, and/or engines may include an annulus with an inlet end through which fuel and air mixture enters and an outlet end from which exhaust exits. A detonation wave travels in a circumferential direction of the annulus and consumes the incoming fuel and air mixture. The burned fuel and air mixture (e.g., combustion gases) exits the annulus and is exhausted with the exhaust flow.

The detonation wave provides a high-pressure region in an expansion region of the combustion. Rotating detonation pressure gain combustion systems are expected to have significant advantages over pulse detonation pressure gain combustors as the net non-uniformity of flow entering a turbine in these systems is expected to be lower by a factor of two to ten.

Maintaining a rotating detonation wave within rotating detonation combustors during low power conditions of the engines, as well as selectively controlling and/or adjusting the operating conditions present technical challenges. For example, when a rotating detonation engine is operating at an idle condition (e.g., not generating enough propulsive force to propel the engine or a vehicle that includes the engine), the detonations rotating within the combustor of the engine may dissipate or be distinguished.

BRIEF DESCRIPTION OF THE EMBODIMENTS

Aspects of the present embodiments are summarized below. These embodiments are not intended to limit the scope of the present claimed embodiments, but rather, these embodiments are intended only to provide a brief summary of possible forms of the embodiments. Furthermore, the embodiments may encompass a variety of forms that may be similar to or different from the embodiments set forth below, commensurate with the scope of the claims.

In one aspect, a propulsion system includes at least one rotating detonation actuator comprising: a flow path extending from an inlet end to an outlet end; an inner wall defining a radially inner boundary of the flow path; an outer wall defining a radially outer boundary of the flow path; and at least one aircraft wing. The rotating detonation actuator is disposed in the aircraft wing. At least one rotating detonation wave travels through the flow path from the inlet end to the outlet end.

In another aspect, a propulsion system includes: at least one rotating detonation actuator including: an annulus extending from an inlet end to an outlet end; an inner wall defining a radially inner boundary of the annulus; an outer wall defining a radially outer boundary of the annulus; and an annular engine casing including an engine exhaust section. The rotating detonation actuator is disposed in the engine exhaust section of the annular engine casing. At least one rotating detonation wave travels through the annulus from the inlet end to the outlet end.

In another aspect, a thrust vectoring system includes: at least one rotating detonation actuator including: an annulus extending from an inlet end to an outlet end; an inner wall defining a radially inner boundary of the annulus; an outer wall defining a radially outer boundary of the annulus; at least one flow surface disposed downstream of the outlet end; and a plurality of fuel injectors disposed in at least one of the inner wall and the outer wall. The plurality of fuel injectors are circumferentially spaced around the annulus. Each fuel injector is selectively actuated to induce a net thrust vector downstream of the outlet end.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 8 is a side schematic representation of a rotating detonation combustor and/or actuator;

FIG. 9 is a side schematic representation of a rotating detonation combustor and/or actuator;

FIG. 12 is an aft looking forward cross-sectional view of an engine;

FIG. 13 is a forward looking aft view of a portion of an aircraft;

FIG. 14 is a forward looking aft view of a portion of an aircraft;

FIG. 15 is a side schematic representation of a portion of a control surface;

FIG. 16 is a side schematic representation of a portion of a control surface;

FIG. 17 is a side schematic representation of a portion of a control surface;

Figure 1:
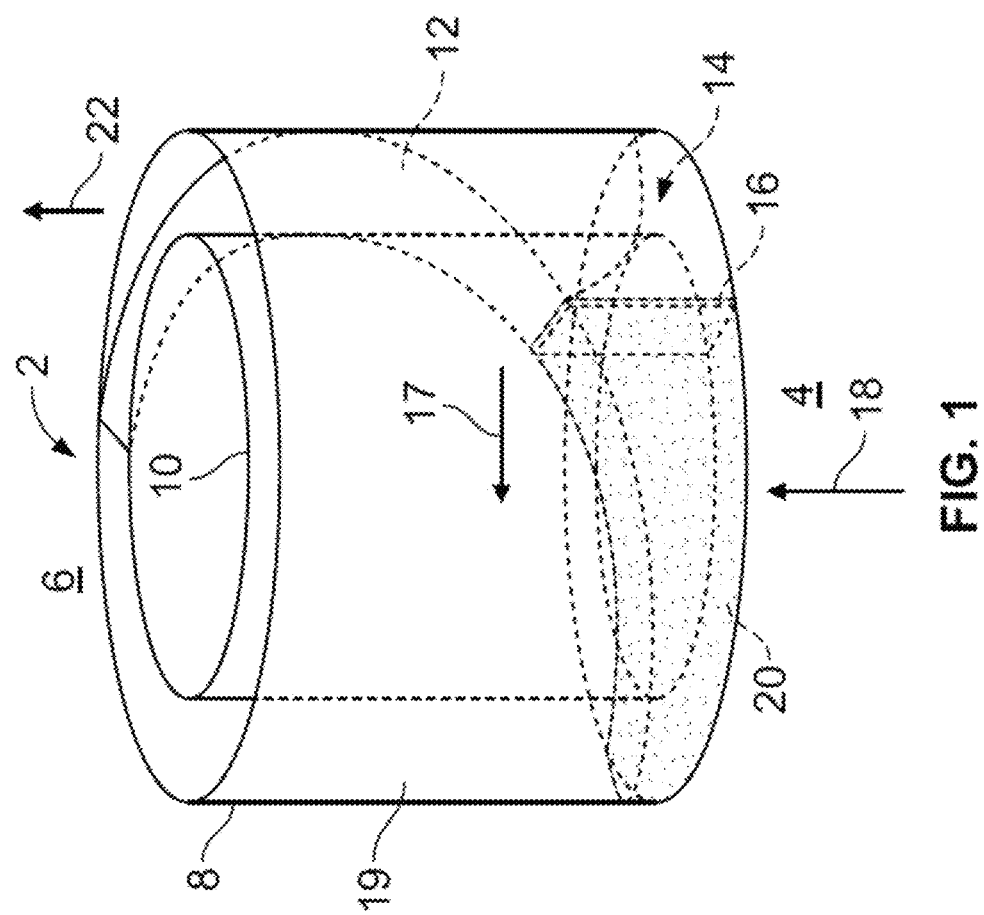
FIG. 1 is a perspective schematic representation of a rotating detonation combustor.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "axial" refers to a direction aligned with a central axis or shaft of a gas turbine engine or alternatively the central axis of a propulsion engine, a combustor, and/or internal combustion engine. An axially forward end of the gas turbine engine or combustor is the end proximate the fan, compressor inlet, and/or air inlet where air enters the gas turbine engine and/or the combustor. An axially aft end of the gas turbine engine or combustor is the end of the gas turbine or combustor proximate the engine or combustor exhaust where combustion gases exit the engine or combustor. In non-turbine engines, (for example ramjets, scramjets, rockets, etc.) axially aft is toward the exhaust and axially forward is toward the inlet.

As used herein, the term "circumferential" refers to a direction or directions around (and tangential to) the circumference of an annulus of a combustor, or for example the circle defined by the swept area of the turbine blades. As used herein, the terms "circumferential" and "tangential" are synonymous.

As used herein, the term "radial" refers to a direction moving outwardly away from the central axis of the gas turbine, or alternatively the central axis of a propulsion engine. A "radially inward" direction is aligned toward the central axis moving toward decreasing radii. A "radially outward" direction is aligned away from the central axis moving toward increasing radii.

FIG. 1 illustrates a schematic diagram of one example of a rotating detonation combustor 2. The combustor 2 includes an annular combustor formed from an outer wall 8 and an inner wall 10. The combustor that is defined by the walls 8, 10 has an inlet end 4 (in which a fuel/air mixture 18 enters) and an outlet end 6 from which an exhaust flow 22 exits the combustor 2. A detonation wave 16 travels in a circumferential direction 17 of the annulus (and around an annular axis of the annulus), thereby consuming the incoming fuel/air mixture 18 and providing a high-pressure region 14 in an expansion region 12 of the combustion. The burned fuel/air mixture (e.g., combustion gases) 19 exit the annulus and are exhausted with the exhaust flow 22. The region 14 behind the detonation wave 16 has very high pressures and this pressure can feed back into an upstream chamber from which the air and fuel are introduced and form an unburnt fuel/air mixture 18.

Figure 2:
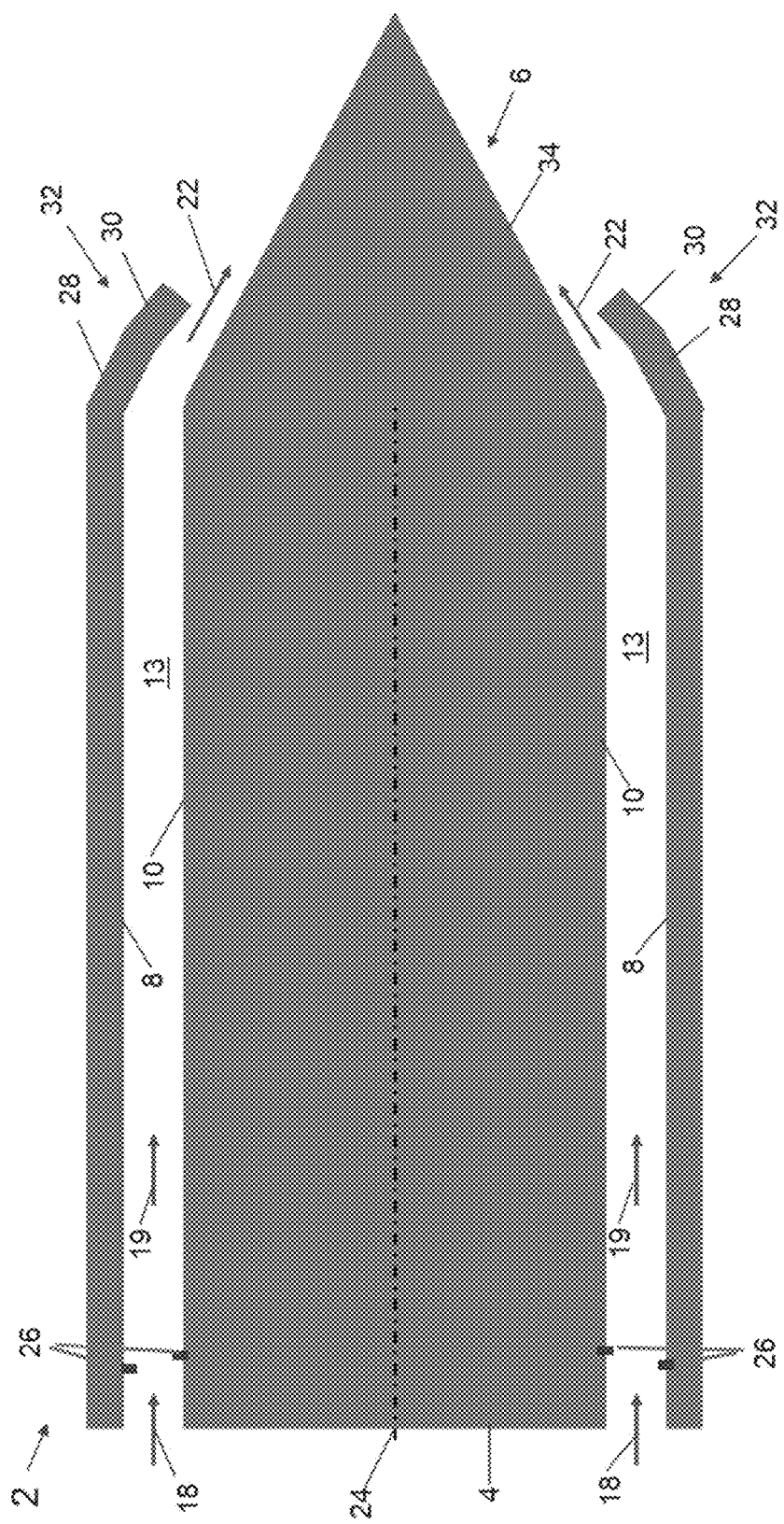
FIG. 2 is a side schematic representation of a rotating detonation combustor and/or actuator.

FIG. 2 illustrates a side view of an exemplary rotating detonation combustor 2 extending between an inlet end 4 and an outlet end 6. The combustor 2 may also be called a rotating detonation actuator 2 (i.e., for flow control actuation). An annulus 13 is defined between the inner wall 10 and the outer wall 8. The annulus 13 is an annular ring, axisymmetric about a combustor centerline 24. An incoming fuel/air mixture 18 enters the annulus 13 at the inlet end 4. At least one igniter 26 may be disposed in the inner wall 10 and/or at the outer wall 8 at the inlet end 4 of the combustor 2, for igniting the fuel/air mixture 18. The at least one igniter 26 may be disposed in both the inner wall 10 and at the outer wall 8 or in other embodiments either the inner wall 10 or the outer wall 8. The at least one igniter 26 may be oriented radially inward (i.e., for igniters disposed in the outer wall 8), radially outward (i.e., for igniters disposed in the inner wall 10), in a circumferential direction, and/or in an axial direction. In addition, the at least one igniter 26 may be oriented such that it has a component in each of the axial, circumferential, and radial directions, and/or subsets thereof (for example circumferential and radial, circumferential and axial, or axial and radial). In embodiments including multiple igniters 26, the igniters may be axially spaced and/or circumferentially spaced at different clock positions around the annulus 13. Exhaust flow 22 exits the combustor 2 at an outlet or downstream end 6 which may have a conical or substantially conical shape at a conical portion 34 that tapers radially inward toward the combustor centerline 24. The conical portion 34 may linearly taper radially inward or may taper radially inward in a curved and/or contoured fashion.

Referring still to FIG. 2, the fuel/air mixture 18 is ignited via the at least one igniter 13 (or via other ignition means such as autoignition or volumetric ignition) resulting in combustion gas 19 which travels both axially and circumferentially through the annulus 13. As the combustion gas 19 travels from an inlet end 4 of the combustor 2 to an outlet end 6, the combustion gas 19 including detonation waves (not shown) travels circumferentially around the annulus 13. An exhaust section 32 is coupled to an axially downstream end of the outer wall 8. The exhaust section 32 may be substantially frustoconical, and may angle radially inward as it transitions axially aftward. The exhaust section 32 may include a first fairing segment 28 and a second fairing segment 30. The first fairing segment 28 may be coupled to the aft end of the outer wall 8, and may form a frustoconical portion that extends circumferentially around the annulus 13 at the aft end 6. The second fairing segment 30 may be coupled to an aft end of the first fairing segment 28, and may form a frustoconical portion that extends circumferentially around the annulus 13, or axially aft of the annulus and/or first fairing segment 28. Each of the first and second fairing segments 28, 30 may be angled radially inward and axially aft such that, in concert with the conical portion 34, they form a flow area that is approximately equal to that of the combustor annulus 13. In other embodiments, each of the first and second fairing segments 28, 30 may be angled radially inward and axially aft such that, in concert with the conical portion 34, they form a flow area that is less than the flow area of the combustor annulus 13. The second fairing segment 30 may angle radially inward at a steeper angle than the first fairing segment 28. Stated otherwise, the second fairing segment 30 may be oriented closer to a radial direction than the first fairing segment 28 while the first fairing segment 28 may be oriented closer to an axial direction than the second fairing segment 30.

The conical portion 34 at the outlet or aft end 6, in concert with the exhaust section 32, (which includes the first fairing segment 28 and the second fairing segment 30), may serve to concentrate the exhaust combustion gases 22 toward the combustor centerline 24, which may enable and/or aid in thrust vectoring the exhaust gas 22 and/or utilizing the exhaust gas 22 for flow control actuation. The exhaust section 32 directs the combustion exhaust gas flow radially inward. In embodiments where the exhaust section 32 and conical portion 34 are angled and/or contoured such that the flow area at the exhaust section 32 is less than the flow area of the annulus 13, the exhaust section 32 and conical portion 34 may also serve to accelerate the flow in a substantially axial direction as the exhaust gas 22 exits the combustor 2.

Figure 3:
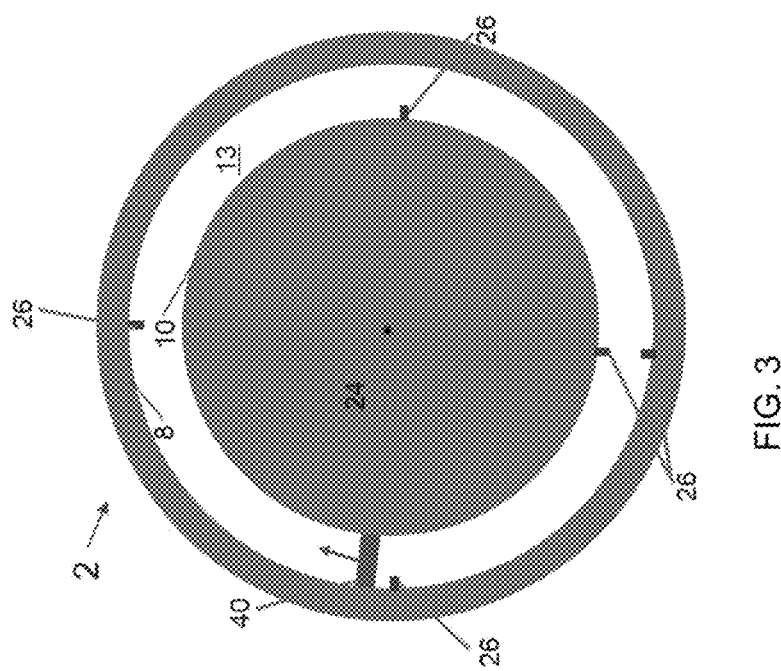
FIG. 3 is a forward looking aft cross-sectional view of a rotating detonation combustor and/or actuator.

FIG. 3 illustrates a forward looking aft view of the combustor (and/or actuator) 2 including an annulus 13 defined by the inner wall 10 and the outer wall 8, both circularly symmetrical about the combustor center line 24. The combustor 2 includes one or more igniters 26 circumferentially spaced around the annulus 13, and disposed on the inner wall 10 and/or at the outer wall 8. In the embodiment of FIG. 3, a detonation wave 40 is schematically illustrated traveling circumferentially around the annulus. Combustor 2 may have a different number of igniters disposed around the inner wall 10 than around the outer wall 8. For example, the combustor 2 may include 2 igniters disposed on the inner wall 10 and 3 igniters disposed on the outer wall 8. In other embodiments, a greater number of igniters may be disposed on the inner wall 10, than on the outer wall 8.

Figure 4:
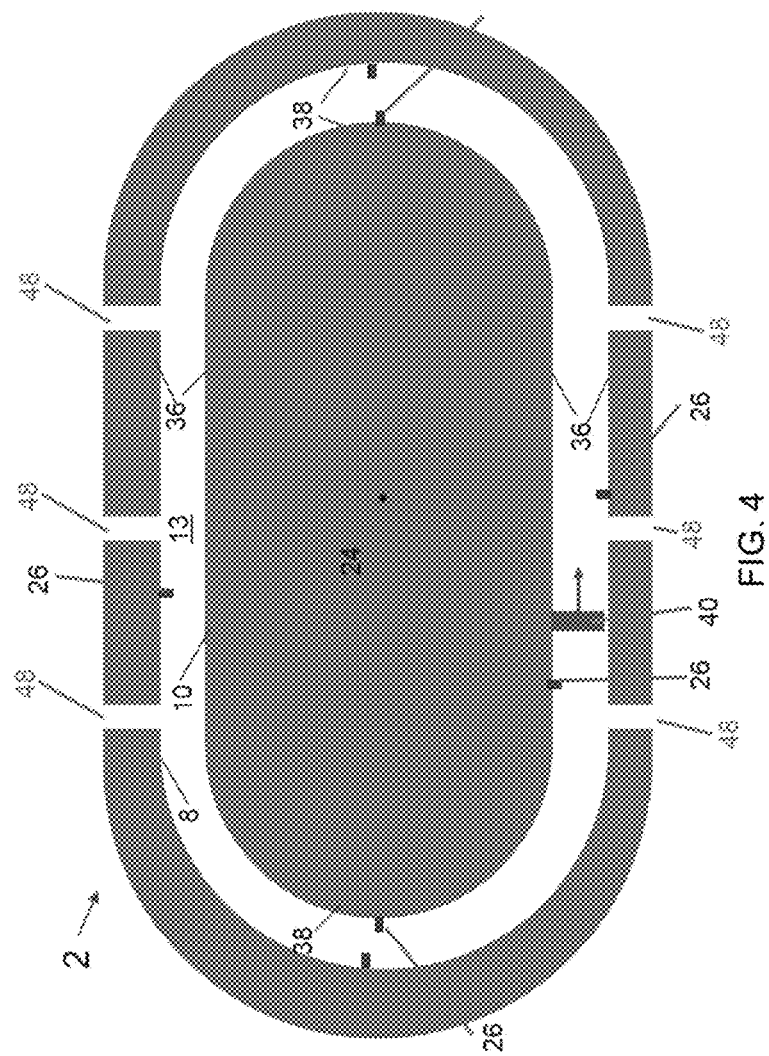
FIG. 4 is a forward looking aft cross-sectional view of a rotating detonation combustor and/or actuator.

FIG. 4 illustrates a forward looking aft view of the combustor (and/or actuator) 2 including an annulus 13 defined by the inner wall 10 and the outer wall 8, both disposed about the combustor center line 24. In the embodiment of FIG. 4, the cross-section of the combustor 2 and annulus are race-track shaped (the annulus being the space between inner and outer race-track shaped walls 10, 8). The race-track shaped combustor 2 of FIG. 4 includes two linear sides 36 disposed opposite each other, as well as two rounded and/or semicircular sides 38 disposed opposite each other. The two rounded sides 38 may be semicircular having a constant radius of curvature. In other embodiments, the two rounded sides 38 may be contoured elliptically, hyperbolically, and/or otherwise curved such that they do not have a constant radius of curvature but instead include a varying curvature. In embodiments with semi-circular rounded sides 38, the length of the linear sides 36 may be from about 0.25 to about 5 times the diameter of the semi-circle defining the curvature of the rounded sides 38. In other embodiments, the length of the linear sides 36 may be from about 0.5 to about 3 times the diameter of the semi-circle defining the curvature of the rounded sides 38. In other embodiments, the length of the linear sides 36 may be from about 1.0 to about 2.0 times the diameter of the semi-circle defining the curvature of the rounded sides 38. In other embodiments, the length of the linear sides 36 may be from about 1.25 to about 1.75 times the diameter of the semi-circle defining the curvature of the rounded sides 38. In other embodiments, the length of the linear sides 36 may be about 1.5 times the diameter of the semi-circle defining the curvature of the rounded sides 38. The combustor 2 includes one or more igniters 26 circumferentially spaced around the annulus 13, and disposed on the inner wall 10 and/or at the outer wall 8. In the embodiment of FIG. 4, a detonation wave 40 is schematically illustrated traveling circumferentially around the annulus. Combustor 2 may have a different number of igniters disposed around the inner wall 10 than around the outer wall 8. For example, the combustor 2 may include 3 igniters disposed on the inner wall 10 and 4 igniters disposed on the outer wall 8. In other embodiments, a greater number of igniters may be disposed on the inner wall 10, than on the outer wall 8.

Referring still to FIG. 4, the combustor and/or actuator 2 may include one or more radial exits 48 disposed in the linear sides 36 as well as the semicircular sides 38. Each of the one or more radial exits 48 may fluidly connect the annulus 13 to an exterior portion of the rotating detonation combustor and/or actuator 2, and each of the one or more radial exits 48 may be used as a conduit through which combustion gases from the rotating detonation flow. Each of the one or more radial exits 48 may be substantially cylindrical. In other embodiments, each of the one or more radial exits 48 may include a non-circular cross section. By asymmetrically injecting fuel into the annulus 13 via the one or more injectors 26 and/or by asymmetrically activating the flow of combustion gases through the one or more radial exits 48, thrust vectoring may be achieved at the axial exit of the combustor and/or actuator 2. As such, the combustor and/or actuator 2 may be used for thrust-vectoring in embodiments that include radial exits 48, as well as in embodiments that do not include radial exits 48. The actuation of fuel through the fuel injectors 26 may occur via fuel metering valves (not shown), and may occur on a scale of about 1 millisecond. For example, the fuel metering valve may open to disperse fuel and close again within about 1 millisecond. In other embodiments, the fuel metering valve may open to disperse fuel and close again within about 0.5 to about 1.5 milliseconds. In other embodiments, the fuel metering valve may open to disperse fuel and close again within about 0.2 to about 3.0 milliseconds. The frequency with which the fuel metering valve may be operated enables thrust vectoring in both a precise and controlled fashion.

In operation, each of the embodiments of FIGS. 1-4 (as well as FIGS. 5-12) may include multiple detonation waves simultaneously propagating in a circumferential (and axial aft) direction such that they wrap around the annulus 13 as they move from an inlet end 4 to an outlet end 6. Chemistry and combustor dynamics, as well as other factors, may limit the minimum size of both the combustor 2 as well as the area and/or volume of the annulus 13 due to a minimum amount of time for the denotation wave 40 to travel around the annulus. As such, the area of the annulus 13, the overall radius of the combustor 2, and/or the overall axial length of the combustor 2 may all be adjusted to ensure the chemistry considerations as well as other factors such as combustor dynamics, aerodynamics, thermal management, and other considerations are all balanced accordingly. In addition, it may be desirable for the combustor 2 to have a race-track shape in order to increase the distance around the annulus 2 that the detonation wave 40 may travel, while simultaneously allowing the axial length and/or radial height of the combustor 2 to be decreased.

Figure 5:
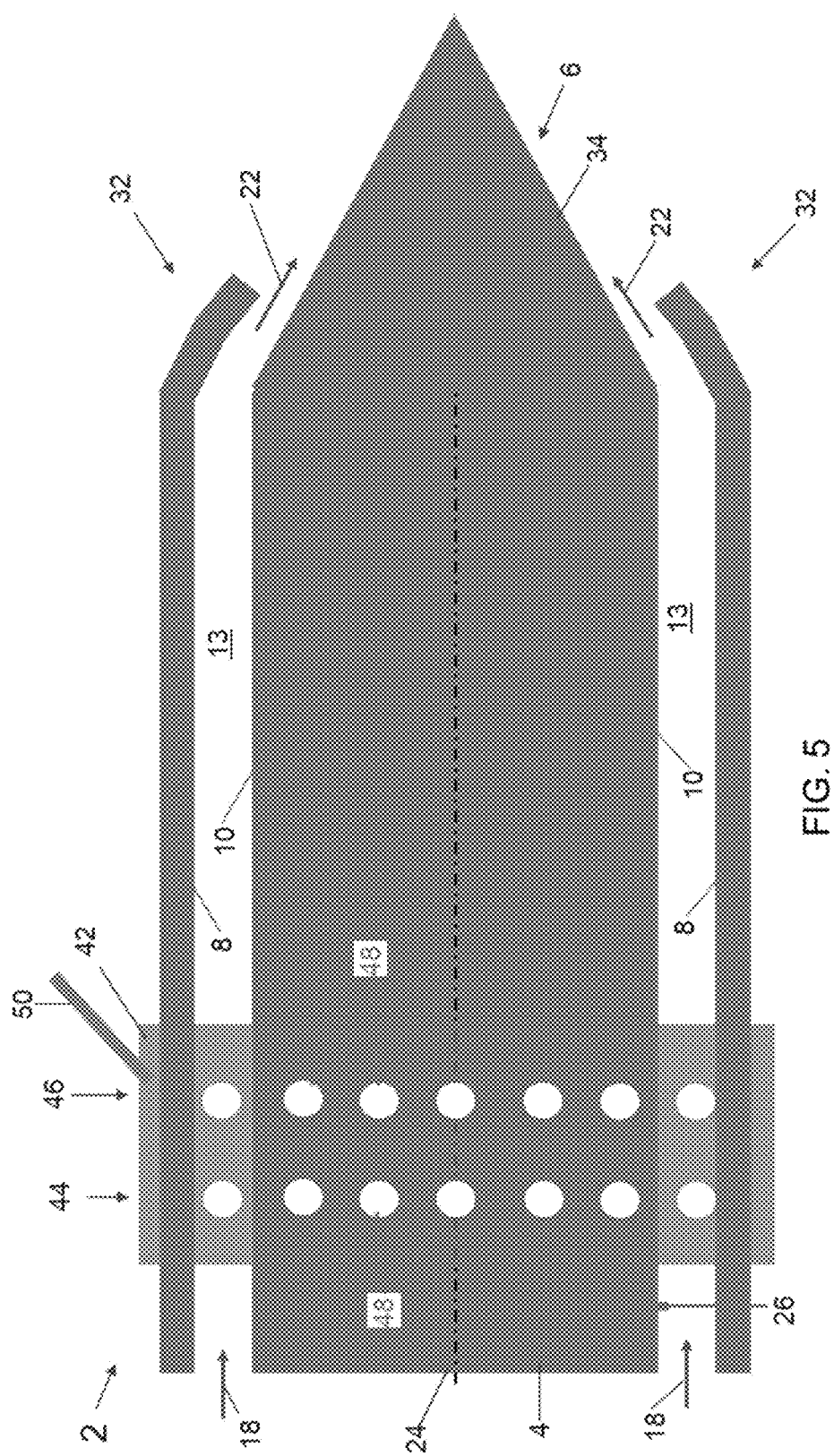
FIG. 5 is a side schematic representation of a rotating detonation combustor and/or actuator.

FIG. 5 illustrates a side view of an exemplary rotating detonation combustor (and/or actuator) 2 extending between an inlet end 4 and an outlet end 6 and including: an annulus 13 defined between the inner wall 10 and the outer wall 8, an inlet fuel/air mixture 18, a combustor centerline 24, at least one igniter 26, an exhaust flow 22, a conical portion 34, and an exhaust section 32. In the embodiment of FIG. 5, the combustor 2 includes a plurality of radial exits 48 disposed circumferentially around the annulus 13. Radial exits 48 may be disposed through the outer wall 8 such that each radial exit 48 fluidly connects the annulus 13 to an exterior of the combustor 2. Stated otherwise, combustion gases may exit the combustor via the outlet end 6 and/or via the plurality of radial exits 48. A manifold 42 may be disposed around the combustor such that combustion gases exiting the combustor 2 via the plurality of radial exits 48 may flow into the manifold 42 where they are routed to another location via at least one manifold exit 50. An outer radius of the manifold 42 may be larger than the outer radius of a body of the combustor 2 (I.e., the combustor outer radius).

Referring still to FIG. 5, the combustor 2 may include a first row 44 of radial exits 48 and a second row 46 of radial exits 48. Each of the first and second rows of radial exits 44, 46 may fluidly connect the annulus 13 to the manifold 42. The first row 44 may be disposed axially upstream of the second row 46. In one embodiment, each radial exit 48 of the first row 44 may be aligned with a radial exit 48 of the second row 46. In other embodiments, each radial exit 48 of the first row 44 may be staggered such that it does not align with a radial exit 48 of the second row 46. Stated otherwise, the first and second rows of radial exits 44, 46 may be aligned with each other or offset from each other. In one embodiment, each radial exit 48 may be selectively opened or closed via a valve and/or other suitable means such that the downstream flow and combustion dynamics within the annulus 13 result in desired thrust vectoring and/or flow control actuation conditions at the combustor outlet end 6. In addition, selectively opening and/or closing at least one radial exit may result in desired flow conditions within the manifold exit 50, through which combustion gases may be routed for other uses. In some embodiments, the radial exits 48 may be selectively opened, closed, and/or partially opened/partially closed. For example, each radial exit 48 may be modulated so that it is opened, closed, partially opened, and/or partially closed so as to actuate or modify a downstream flow and/or thrust vector.

The manifold 42, first row 44, and second row 46 of radial exits 48 may all be disposed within an axially upstream half of the combustor 2, within an axially downstream half of the combustor 2, and/or within a substantially axially central portion of the combustor 2. In some embodiments, the combustor 2 may include only a single row of radial exits 48. In other embodiments, the combustor 2 may include more than two rows of radial exits 48. The manifold 42, first row 44, and second row 46 of radial exits 48 may all be disposed axially downstream of the at least one igniter 26. The cross-sectional shape of each radial exit may be circular, slotted (i.e., rectangular), elliptical, and/or other suitable shapes.

Figure 6:
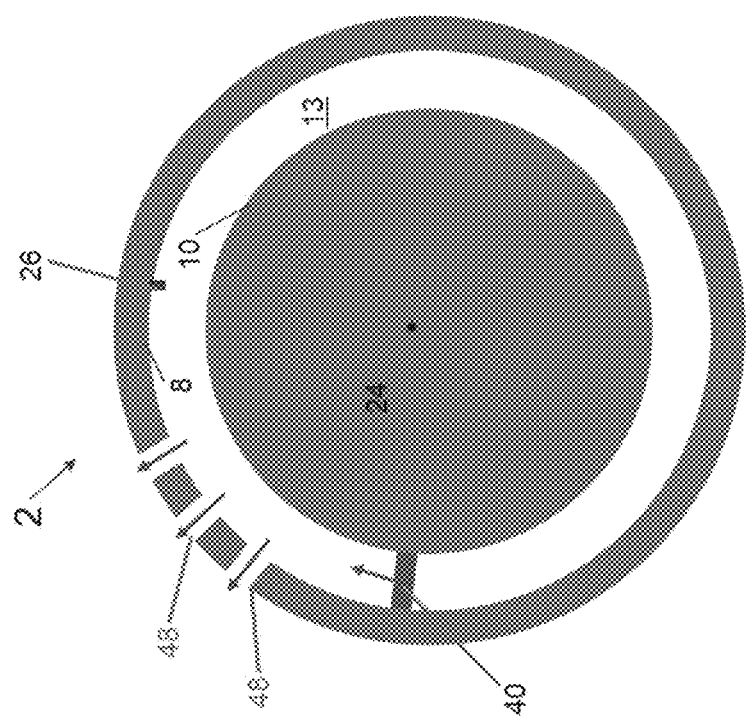
FIG. 6 is a forward looking aft cross-sectional view of a rotating detonation combustor and/or actuator.

FIG. 6 illustrates a forward looking aft view of the combustor (and/or actuator) 2 including an annulus 13 defined by the inner wall 10 and the outer wall 8, both circularly symmetrical about the combustor center line 24. The combustor 2 includes one or more igniters 26 circumferentially spaced around the annulus 13, disposed on the inner wall 10 and/or at the outer wall 8, as well as a detonation wave 40. In the embodiment of FIG. 6, the combustor 2 includes multiple radial exits 48 disposed in the outer wall, fluidly connecting the annulus 13 to the exterior of the combustor 2. The multiple radial exits 48 may be disposed around the entire circumference of the combustor 2, or may be disposed in only an arc portion of the combustor 2, as illustrated in FIG. 6.

Figure 7:
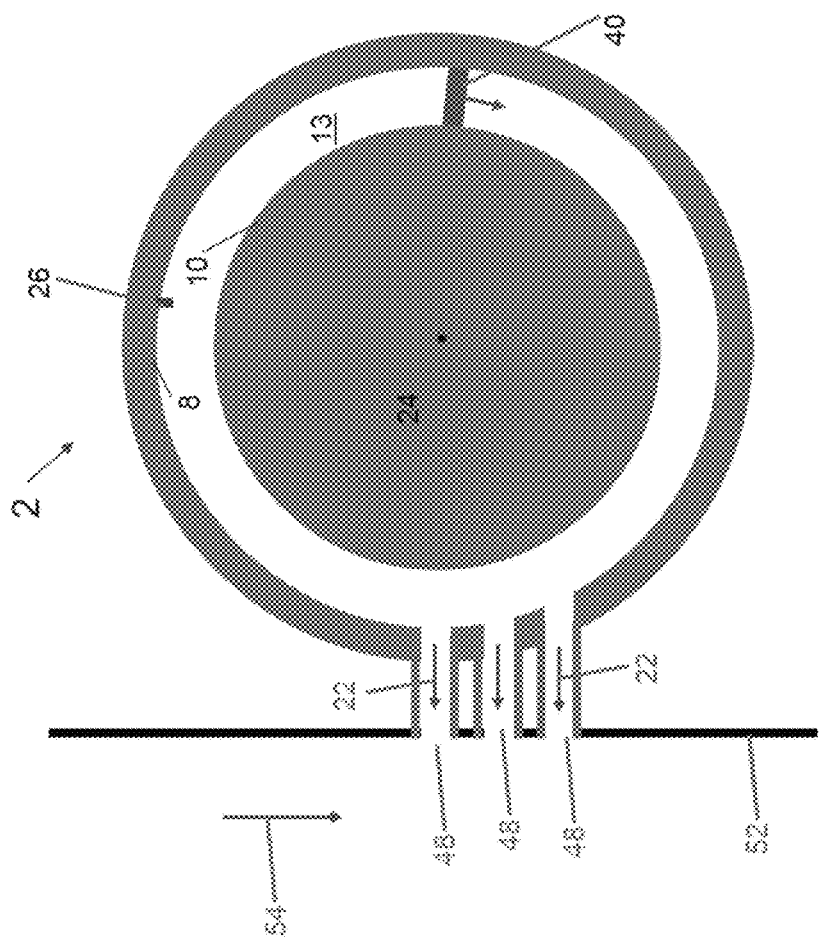
FIG. 7 is a forward looking aft cross-sectional view of a rotating detonation combustor and/or actuator.

FIG. 7 illustrates a forward looking aft view of the combustor (and/or actuator) 2 including an annulus 13 defined by the inner wall 10 and the outer wall 8, both circularly symmetrical about the combustor center line 24. The combustor 2 includes one or more igniters 26 circumferentially spaced around the annulus 13, disposed on the inner wall 10 and/or at the outer wall 8, as well as a detonation wave 40. In the embodiment of FIG. 7, the combustor 2 is part of a system including at least one flow surface 52 onto which the radial exits 48 disperse exhaust gas 22 in order to control or actuate an external flow 54 that is flowing across the flow surface 52. The exhaust gas 22 interacts with the external flow 54 such that at least one flow characteristic of the external flow 54 across the flow surface 52 is adjusted and/or changed. Each of the radial exits 48 may include a tube length that is tailored to provide pulses of exhaust flow 22 and/or combustion products at the same time. For example, as the rotating wave approaches the plurality of radial exits 48, the first radial exit it reaches has the longest tube length while the last radial exit it reaches has the shortest, such that the pulses of exhaust gas 22 reach the flow surface 52 at approximately the same time.

In the embodiment of FIG. 7, each of the radial exits 48 are illustrated as substantially parallel to each other. However, the embodiment of FIG. 7 may include radial exits 48 that are radially oriented (similar to FIG. 6) rather than substantially parallel. Each of the embodiments of FIGS. 6 and 7 may include multiple rows of radial exits (for example, a second row 46 axially aft of a first row 44, not shown). Each of the embodiments of FIGS. 6 and 7 may include a circular cross-sectional shape or a race-track shaped cross section. Each of the embodiments of FIGS. 6 and 7 may include a manifold 42 fluidly coupled downstream of the radial exits 48. Each of the embodiments of FIGS. 6 and 7 may include a manifold exit 50 downstream of the manifold 42. Each of the embodiments of FIGS. 6 and 7 may include multiple igniters 26 and multiple igniter configurations, similar to those of FIGS. 3 and 4.

FIG. 8 illustrates a side view of a rotating detonation combustor (and/or actuator) 2 extending between an inlet end 4 and an outlet end 6 and including an annulus 13 defined between the inner wall 10 and the outer wall 8. In the embodiment of FIG. 8, a conical outer casing 120 is disposed at the aft end 6, radially outward of the conical portion 34. The conical outer casing 120 and the conical portion 34 collectively define an exhaust conduit 118 fluidly coupled to the annulus 13. Combustion gases flow from the annulus into the exhaust conduit 118 and eventually through an axial exit 122 fluidly coupled to the exhaust conduit 118 and disposed within and/or at a flow surface 52. In operation, the combustion gases exiting at the axial exit 122 may be used to modify at least one flow characteristic at the flow surface 52 and/or of the external flow 54. For example, the combustion gases exiting at the axial exit 122 may be used to provide momentum addition to the external flow 54. In other embodiments, the combustion gases exiting at the axial exit 122 may be used to modify a boundary layer for separation control (i.e., to prevent the external flow 54 from separating from the flow surface 52) as well as for other purposes. In other embodiments, the combustion gases exiting at the axial exit 122 may be used for mixing of low and high momentum fluids for separation control or other purposes. In other embodiments, the combustion gases exiting at the axial exit 122 may be used to modify a flow angle and/or trajectory of the external flow 54, for thrust vectoring or for other purposes. Combustion gases may exit at the axial exit such that they are substantially orthogonal and/or normal to the flow surface 52. In other embodiments, the combustion gases may exit at the axial exit 122 such that they are forming an acute and/or obtuse angle with the flow surface 52.

FIG. 9 illustrates a side view of a rotating detonation combustor 2 similar to the embodiment of FIG. 8. In the embodiment of FIG. 9, the aft end of the conical outer casing 120 is coupled to a flow tube 124. An axial exit 122 is disposed at the aft end of the flow tube 124. The flow tube 124 may serve to direct the combustion gases in an axially aft direction prior to exiting the rotation detonation combustor (and/or actuator) 2 at the axial exit 122. The embodiments of FIGS. 2, 5, 8 and 9 may also include truncated embodiment which do not include the conical portion 34, the exhaust section 32 and/or the exhaust conduit 118, and instead are simply truncated at the downstream end 6 of annulus 13.

Figure 10:
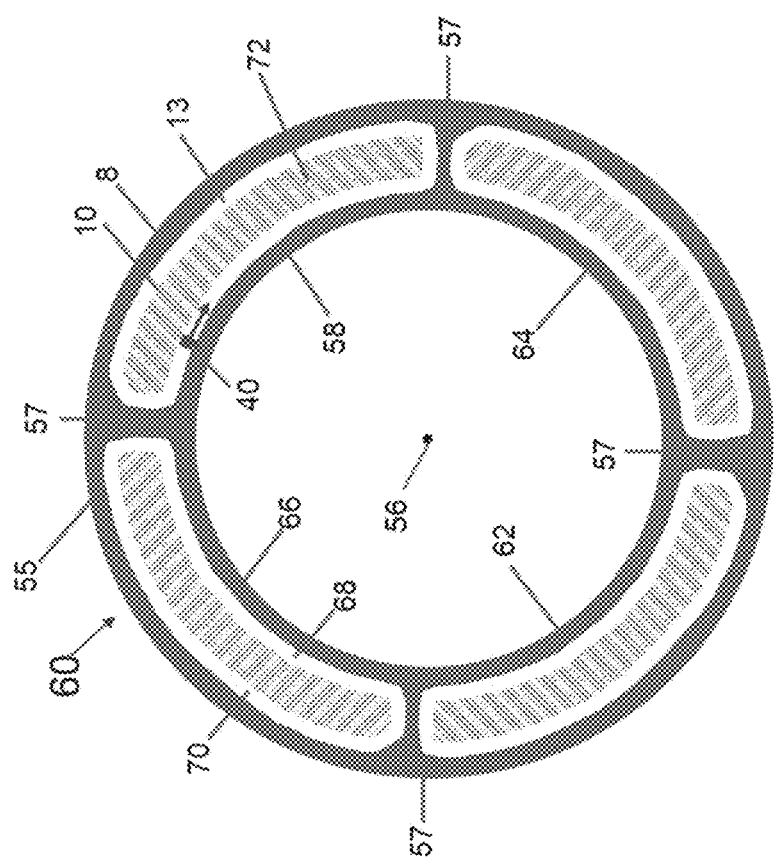
FIG. 10 is an aft looking forward cross-sectional view of an engine.

FIG. 10 illustrates an aft looking forward cross-sectional view of an engine 60 including at least one rotating detonation combustor. The engine 60 includes a first combustor 58, a second combustor 64, a third combustor 62, and a fourth combustor 66 circumferentially disposed within an annular engine casing 55, circularly defined around an axial engine centerline 56. Each of the first through fourth combustors 58, 62, 64, 66 includes an annulus 13 defined between in inner wall 10 and an outer wall 8, as well as a rotating detonation wave 40 which may travel around the annulus 13 as it moves axially aftward through the respective combustor 58, 62, 64, 66 and engine 60. The annulus 13 is defined as the space between the inner wall 10 and the outer wall 8 which may be non-circular in shape and/or elongated, resulting in a non-circular and/or elongated annulus 13. In each of the embodiments disclosed herein, the annulus 13 may also be defined as the flow path through which rotating detonation waves travel. Each of the first through fourth combustors 58, 62, 64, 66 includes both an inner annulus band 68 and an outer annulus band 70 with the inner annulus band 68 being disposed radially inward of the outer annulus band 70. Each of the first through fourth combustors 58, 62, 64, 66 includes a combustor center body 72 disposed between the inner annulus band 68 and the outer annulus band 70. The first through fourth combustors 58, 62, 64, 66 may be separated by one or more radial segments 57 disposed in the engine casing 55 between circumferential edges of each of the first through fourth combustors 58, 62, 64, 66.

The engine 60 of FIG. 10 may include different numbers of combustors circularly disposed about the engine centerline 56 within the engine casing 55. For example, the engine 60 may include 1, 2, 3, 4, and/or greater numbers of combustors. The combustors may be arranged in symmetrical or asymmetrical configurations about the engine centerline 56. Each combustor may extend across or span an arc segment of the annular engine casing 55. For example, each of the first through fourth combustors 58, 62, 64, 66 of FIG. 10 spans an arc segment of approximately 90 degrees (plus 5 degrees and minus 10 degrees. Stated otherwise, each of the first through fourth combustors 58, 62, 64, 66 of FIG. 10 spans an arc segment in a range from about 80 degrees to about 95 degrees. Each of the inner annulus band 68 and the outer annulus band 70 are contoured to match the contouring of the annular engine casing 55. For example, each of the inner annulus band 68 and the outer annulus band 70 are contoured such that they have a concave portion oriented radially inward.

Figure 11:
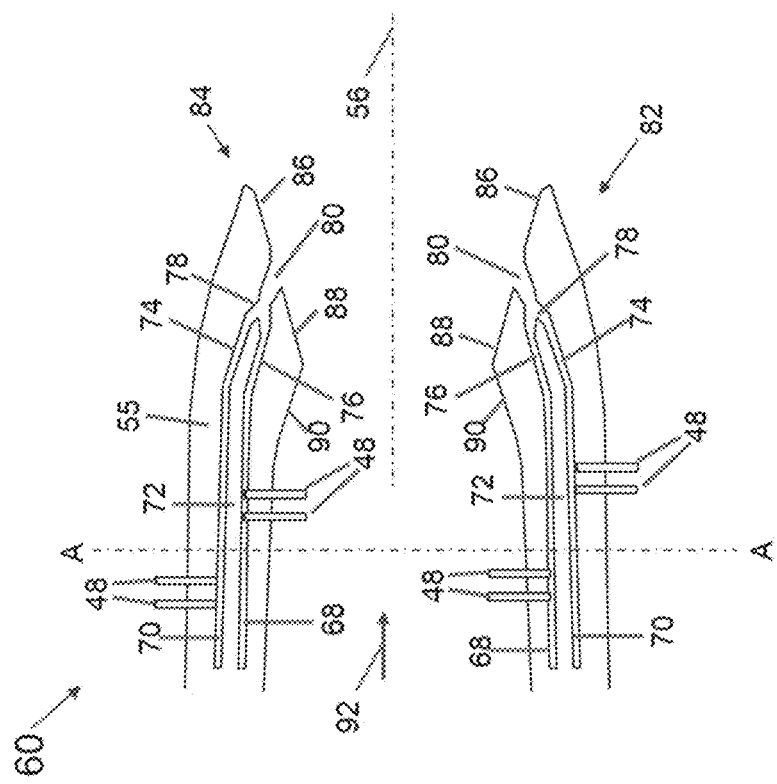
FIG. 11 is a side schematic representation of a portion of an engine.

FIG. 11 illustrates a side cross-sectional view of an engine 60 including at least one rotating detonation combustor. The aft looking forward view illustrated in FIG. 10 is taken at cut-line A-A in FIG. 11. The embodiment of FIG. 11 illustrates a lower annulus portion 82 and an upper annulus portion 84, both circularly disposed about the engine centerline 56. The inner and outer annulus bands 68, 70 wrap circumferentially within the engine casing 55 while also extending axially aft. Each of the inner annulus band 68 and the outer annulus band 70 are separated by the combustor center body 72, and may be fluidly connected to one or more radial exits 48. Each of the inner annulus band 68 and the outer annulus band 70 are fluidly connected to an inner angled portion 76 and an outer angled portion 74 respectively, at their respective axially downstream ends. The inner and outer angled portions 76, 74 are angled radially inward and act as transitions between the inner and outer annulus bands 68, 70 and a mixer coupling 78, where the inner annulus band 68 and the outer annulus band 70 intersect.

Referring still to FIG. 11, the mixer coupling 78 serves to mix the flows of combustion gas through each of the inner and outer annulus bands 68, 70 upstream of a combustor exit 80 which fluidly connects each of the inner and outer annulus bands 68, 70 to an interior of the engine 60. The combustor exit 80 divides the annular engine casing 55 into an inner diverging segment 88 and an outer diverging segment 86. The inner and outer diverging segments 88, 86 diverge in a radially outward direction as they transition axially afterward. The inner and outer diverging segments 88, 86 may form the axially aft portions of engine casing 55 and may be colinear with each other. The outer diverging segment 86 may be radially outward and axially aft of the inner diverging segment 88. Axially forward of the inner diverging segment 88, an inner converging segment 90 may be disposed in a radially inward portion of the engine casing 55. The inner converging segment 90 may angle radially inwards at it transitions axially aftward. At each of the one or more combustor exits 80, combustion gases from each of the one or more combustors 58, 62, 64, 66 (shown in FIG. 10) may mix with an axial engine flow 92, which may include fuel, air, a fuel-air mixture, and/or combustion gas.

FIG. 12 illustrates an aft looking forward cross-sectional view of an engine 60 including at least one rotating detonation combustor (and/or actuators) 2. In the embodiment of FIG. 12, a plurality of substantially circular rotating detonation combustors and/or or actuators 2 are circumferentially spaced around an annular engine casing 55. Each of the rotating detonation combustors and/or or actuators 2 may include inner and outer walls 10, 8 disposed around a center body 72 and defining an annulus 13. The annular engine casing 55 may be axisymmetric about an engine centerline 56. In other embodiments, each of the rotating detonation combustors and/or or actuators 2 may be oval, race-track shaped and/or other non-circular shapes. The engine 60 of FIG. 12 may include between about 2 and about 100 rotating detonation combustors and/or or actuators 2. In other embodiments, the engine 60 of FIG. 12 may include between about 3 and about 60 rotating detonation combustors and/or or actuators 2 circumferentially spaced around an annular engine casing 55. In other embodiments, the engine 60 of FIG. 12 may include between about 4 and about 50 rotating detonation combustors and/or or actuators 2 circumferentially spaced around an annular engine casing 55. In other embodiments, the engine 60 of FIG. 12 may include between about 5 and about 40 rotating detonation combustors and/or or actuators 2 circumferentially spaced around an annular engine casing 55. In other embodiments, the engine 60 of FIG. 12 may include between about 6 and about 30 rotating detonation combustors and/or or actuators 2 circumferentially spaced around an annular engine casing 55. In other embodiments, the engine 60 of FIG. 12 may include between about 7 and about 20 rotating detonation combustors and/or or actuators 2 circumferentially spaced around an annular engine casing 55. In other embodiments, the engine 60 of FIG. 12 may include between about 8 and about 18 rotating detonation combustors and/or or actuators 2 circumferentially spaced around an annular engine casing 55.

The engine 60 may include a gas turbine engine and/or other types of engines (for example scram-jet engines) disposed within an interior 57 of the annular engine casing 55. Each of the rotating detonation combustors and/or or actuators 2 may be used for thrust-vectoring, flow control, thrust production, and/or other purposes. The plurality of substantially circular rotating detonation combustors and/or or actuators 2 may serve as the primary propulsion system for the engine or may serve as a secondary and/or auxiliary propulsion systems. In other embodiments, the plurality of substantially circular rotating detonation combustors and/or or actuators 2 may serve as a primary propulsion system for the engine during one mode of operation and may serve as a thrust vectoring system, a flow control actuation system, and/or or some other purpose during a second or alternate mode of operation. For example, according to the embodiments disclosed herein, the plurality of substantially circular rotating detonation combustors and/or or actuators 2 may be disposed in an exhaust portion of an aircraft and/or engine (as well as elsewhere on an aircraft and/or engine) and may be used to modulate the amount of flow coming out of the each actuator 2 to modify the trajectory of the engine exhaust (i.e., thrust vectoring).

FIG. 13 illustrates a front view of a portion of an aircraft 100 including a fuselage 94 and at least one wing (or control surface) 96. Disposed in the wing 96 may be an engine 60 including a rotating detonation combustor 2, which in turn includes an annulus 13 disposed around a combustor center body 72 and disposed between an inner wall 10 and an outer wall 8. In other embodiments, rotating detonation actuators 2 alone (i.e., with no accompanying engine or structures thereof) may be disposed in the wing or control surface 96. The annulus 13 is defined as the space between the inner wall 10 and the outer wall 8 which may be non-circular in shape and/or elongated, resulting in a non-circular and/or elongated annulus 13. The rotating detonation combustor 2 may be elliptical, race-track shaped, oval, rectangular, trapezoidal, and/or other suitable shapes, and may be generally elongated so as to conform to the form factor of the wing 96. The rotating detonation engine 60 and combustor 2 may be used to provide thrust in an aftward direction, thereby providing the aircraft with a source of propulsion, separation control, and/or other flow control mechanisms. For example, the embodiment of the flow control actuator and/or combustor 2 illustrated in FIG. 4 may be used in the embodiment of FIG. 13 (for example in the wing or control surface 96) such that rotating detonation occurs along the full (or partial) length of the wing 96, acting as a source of propulsion for the aircraft 100, and/or acting as a source of separation control, and/or as other flow control mechanisms. Similar to the embodiment of FIG. 4, in the embodiment of FIG. 13, fuel may be injected within the annulus 13 asymmetrically (i.e., more fuel injected on the top and/or on the bottom) such that a net thrust vector occurs at a downstream exit. This may allow the aircraft 100 to be maneuvered without the need for movable control surfaces, such as wing flaps, etc.

FIG. 14 illustrates a front view of a portion of an aircraft 100 including a fuselage 94 and at least one wing 96 (or control surface). Disposed in the wing 96 is an engine 60 including multiple rotating detonation combustors 2, each including an annulus 13 disposed around a combustor center body 72 and disposed between an inner wall 10 and an outer wall 8. In other embodiments, rotating detonation actuators 2 alone (i.e., with no accompanying engine or structures thereof) may be disposed in the wing or control surface 96. The annulus 13 is defined as the space between the inner wall 10 and the outer wall 8 which may be non-circular in shape and/or elongated, resulting in a non-circular and/or elongated annulus 13. The rotating detonation combustors 2 may be elliptical, race-track shaped, oval, rectangular, trapezoidal, and/or other suitable shapes, and may be generally elongated so as to conform to the form factor of the wing 96. The rotating detonation engine 60 and combustor 2 may be used to provide thrust in an aftward direction, thereby providing the aircraft with a source of propulsion. In the embodiment of FIG. 14, it may be desirable to dispose multiple rotating detonation combustors 2 in the aircraft wing 96 rather than a single rotating detonation combustor 2 due to a maximum operational size of the geometry of the rotating detonation combustor 2. Therefore, multiple smaller rotating detonation combustors 2 may be desired over a single larger rotating detonation combustor 2.

FIGS. 15-17 illustrate a side view of the wing (or control surface) 96 of FIGS. 13 and 14. In the embodiment of FIG. 15, the annulus 13 includes an upper annulus portion 98 and a lower annulus portion 102. A first flow 104 exits the upper annulus portion 98 while a second flow 108 exits the lower annulus portion 102. Each of the first and second flows 104, 108 may interact with one or more external flows 110 such that at least one flow characteristic of the one or more external flows 110 is modified. For example, different amounts of fuel and/or air (or oxidizer) may be injected within each of the upper annulus portion 98 and the lower annulus portion 102 such that the resulting first and second flows 104, 108 include different mass and/or energy flows, resulting in a net effect on the overall aerodynamics of the wing (or control surface) 96. The embodiments disclosed herein may result in what is known as a "blown flap" (or circulation control) by modulating the first and second flows 104, 198 on the wing 96 with a rounded trailing edge. For example, if first flow 104 is higher magnitude (i.e., increased mass flow and/or velocity) than that of the second flow 108, the first flow 104 over the upper surface of the wing 96 may stay attached to the surface longer, and the wake of the flow coming off of the wing may be vectored downward. This may have the same effect as an airplane flap, and may be used to modulate lift and drag The net effect may result in increased lift, reduced drag (due to a reduction in flow separation), increased propulsive forces, thrust vectoring, and/or other effects including changes to one or more of a fluid momentum, a boundary layer height, a boundary layer velocity profile, a flow energy, a flow velocity, a shock wave location, a shock wave angle, a turbulence profile, a flow angle, and/or a flow temperature. In operation, at least one rotating detonation wave (not shown) circumferentially dissipates around the annulus 13 (through both the upper and lower annulus portions 98, 102) as the at least one rotating detonation wave travels toward the outlet end 6 of the wing 96.

In the embodiment of FIG. 16, the first and second flows 104, 108 may flow over an upper surface 104A and a lower surface 108A of an aircraft wing flap (or control surface 106). The aircraft wing flap (or control surface 106) may be rotatably coupled to the aft end 6 of the wing, and may be able to be modulated to allow for different aerodynamic effects to act on the wing 96, wing flap 106, and/or control surfaces during different portions of a flight. The wing flap 106 may be positioned toward a downward and/or an aft position, according to one or more desired operating conditions. The embodiments disclosed herein may result in better control of flow separation (which may occur when the wing flap or control surface 106 is deflected to a high angle), in order to modulate lift.

In the embodiment of FIG. 17, the upper and lower annulus portions 98, 102 may mix at a mixer coupling 78 prior to exiting the wing (or control surface) 96 at a combustor (or actuator) exit 80. A first flow 104 may flow across the upper surface 104A of the wing flap 96, after exiting through the combustor (or actuator) exit 80. In alternate embodiments and/or modes of operation, the first flow may flow across the lower surface 108A of the wing flap (or control surface) 96 rather than across the upper surface 104A. For example, the first and/or second flows 104, 108 (not shown) may add fluid momentum close to the surface of the wing 96 and or wing flap 106, thereby allowing external airstreams 110 flowing across the wing 96 and wing flap 106 to flow much closer to the respective surfaces, which in turn may increase lift forces and decrease drag forces acting on the wing 96.

Each of the embodiments of FIGS. 15-17 may include a rotating detonation combustor and/or actuator 2 within the wing or control surface 96. In addition, each of the embodiments of FIGS. 15-17 may use the rotating detonation combustor and/or actuator 2 as a primary, secondary, and/or auxiliary aircraft propulsion system, and/or as a flow control actuator, and/or for another purpose. In addition, each of the embodiments of FIGS. 15-17 may use the rotating detonation combustor and/or actuator 2 to modulate the aerodynamic lift acting on the wing or control surface 96. In addition, the embodiment of FIG. 15 may include a wing or control surface with a rounded trailing edge portion disposed at the aft end 6, as illustrated. In addition, each of the embodiments of FIGS. 15-17 may include at least one fuel injector 26 (not shown) disposed in each of the upper annulus portion 98 and the lower annulus portion 102 where the fuel injector acts to modulate a fuel flow into each of the upper annulus portion 98 and the lower annulus portion 102 resulting in change to the respective velocities of combustion gases exiting from each of the upper annulus portion 98 and the lower annulus portion 102.

Figure 18:
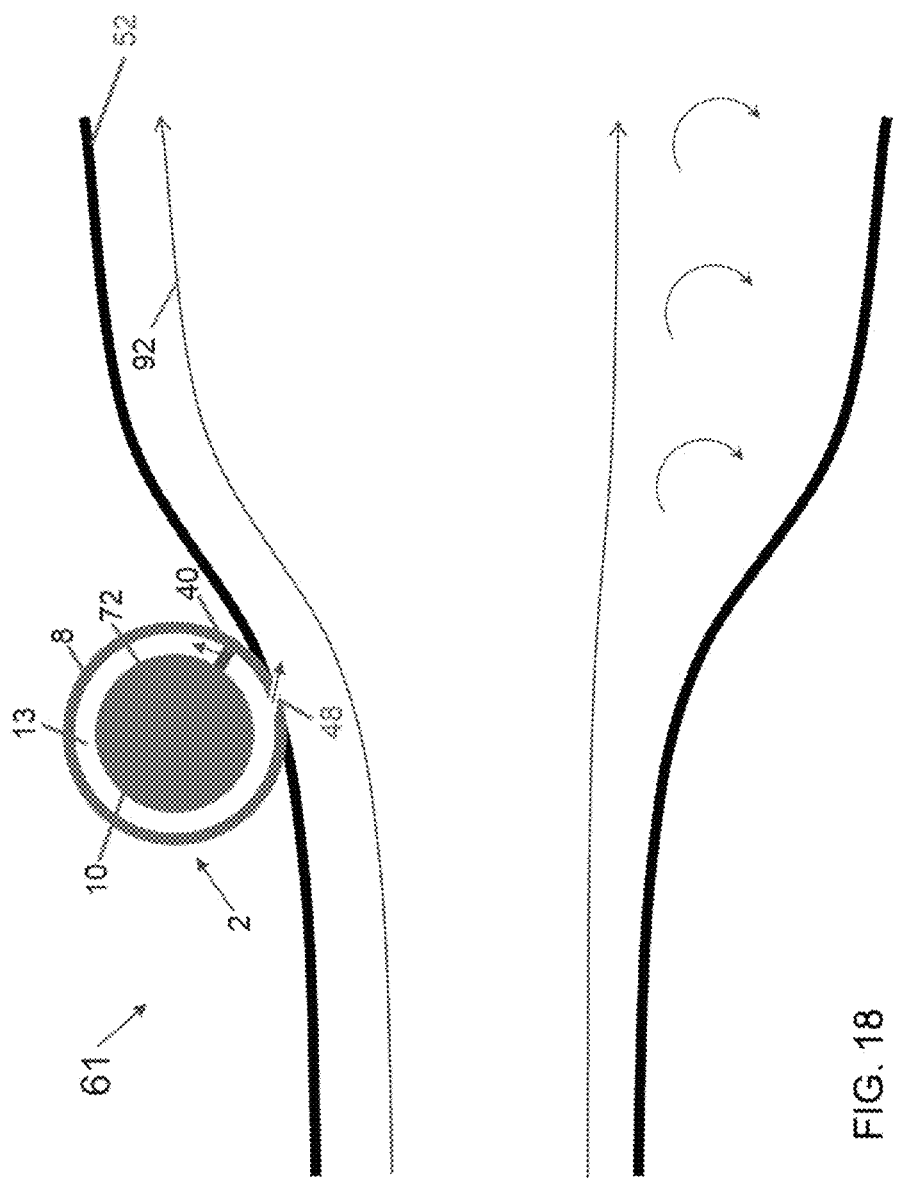
FIG. 18 is a side schematic representation of a flow surface and flow control actuator.

FIG. 18 illustrates a side view of a diffusor 61 including a rotating detonation combustor 2 used as a flow control actuator for separation control. The rotating detonation combustor 2 includes an annulus 13 disposed around a combustor center body 72 and disposed between an inner wall 10 and an outer wall 8. A detonation wave 40 travels around the annulus 13. Combustion gases travel from the rotating detonation combustor 2 to a flow surface 52 via at least one radial outlet 42. The combustion gases enhance the flow of a fluid 92 across the flow surface 52, thereby minimizing separation. Stated otherwise, a first flow exiting the radial exit 48 may serve to modulate a second flow (i.e., flow 92) flowing across the flow surface 52, where the modulation of the second flow (i.e., flow 92) may include a reduction of the fluid-dynamic separation of the flow 92 from the flow surface 52. The flow 92 may include fuel, air, a fuel-air mixture, and/or combustion gas.

Figure 19:
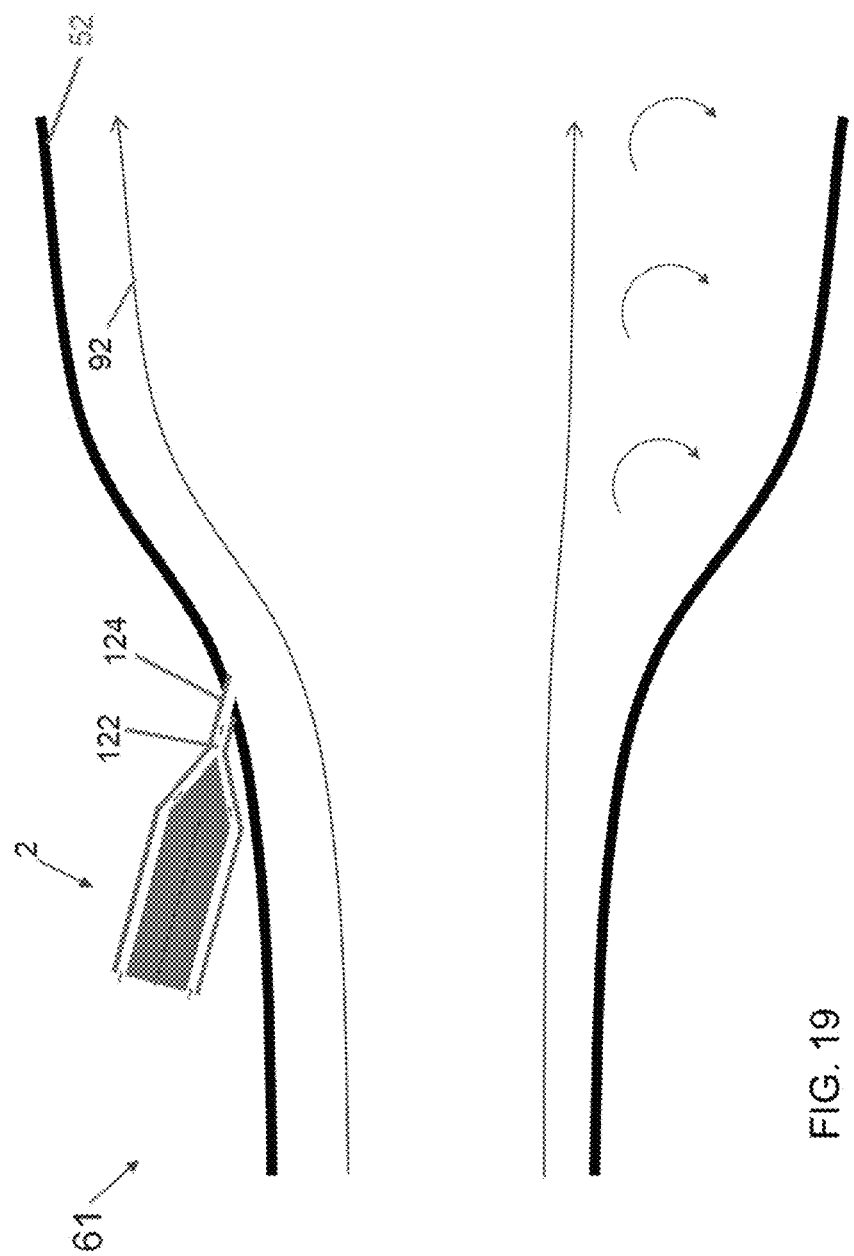
FIG. 19 is a side schematic representation of a flow surface and flow control actuator.

FIG. 19 illustrates a side view of a diffusor 61 including a rotating detonation combustor (or actuator) 2 used as a flow control actuator for separation control, similar to that of FIG. 18. In the embodiment of FIG. 19, the rotating detonation combustor (or actuator) 2 includes a flow tube 124 fluidly coupling the axial exit 124 to a flow surface 52, similar to the rotating detonation actuator 2 depicted in FIG. 9.

Figure 20:
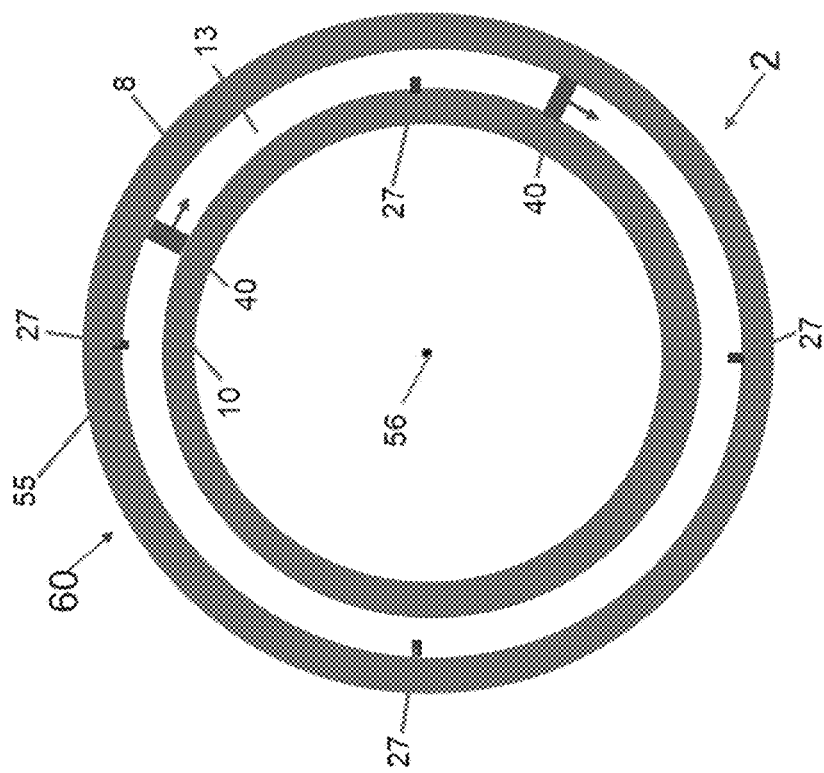
FIG. 20 is an aft looking forward cross-sectional view of an engine.

FIG. 20 illustrates an aft looking forward cross-sectional view of an engine 60 including at least rotating detonation combustor 2. The rotating detonation combustor (or actuator) 2 of FIG. 20 may include an annular engine casing 55 radially surrounding an engine centerline 56, including an inner annular wall 10, and an outer annular wall 8 collectively defining an annulus 13. The embodiment of FIG. 20 may include multiple fuel injectors 27 circumferentially spaced around the annulus 13, protruding from the inner wall 10 and/or the outer wall 8, as well as a rotating detonation wave 40 (i.e., when in operation). In other embodiments, the one or more fuel injectors 27 may not be protruding from the inner wall 10 and/or the outer wall 8 and instead may be flush with the inner wall 10 and/or the outer wall 8. In operation, by selectively injecting fuel into the annulus 13 via different fuel injectors 27 at different circumferential (or clock) positions, and/or by modulating the amount of fuel flow through each fuel injector 27, vectored thrust may result at the combustor exit 80. As fuel is dispersed in an asymmetric fashion, the resulting detonation wave(s) 40 will also asymmetrically exit the engine 60, thereby producing more thrust in one or more circumferential portions of the annular exhaust than in other portions, resulting in a net thrust vector that is oriented in a different direction than the axial direction (i.e., out of the page). Thrust vectoring may also be accomplished by modifying the blockage created by exhaust gases, which turns the flow, thereby resulting in one or more nest thrust vectors.

Figure 21:
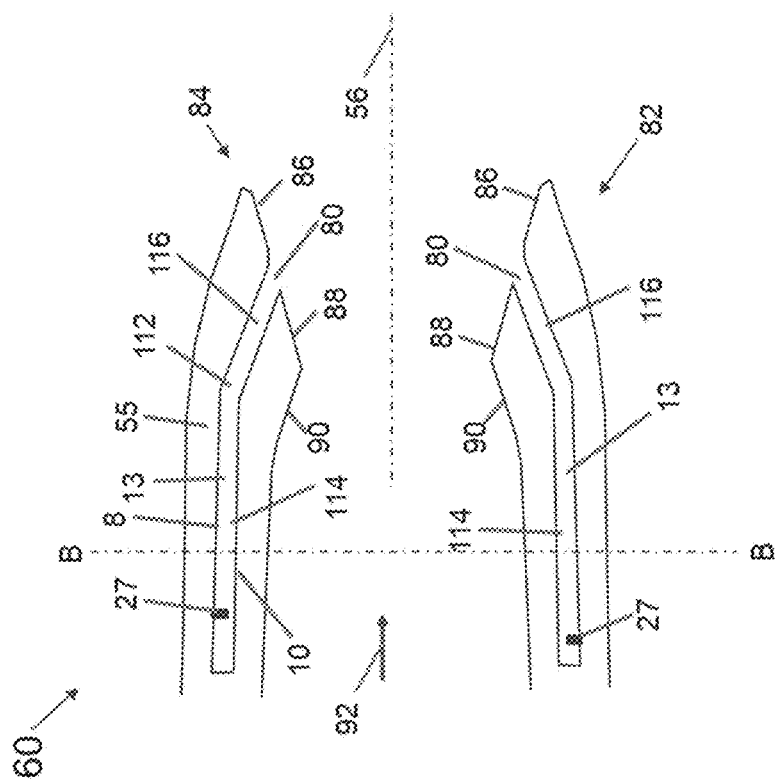
FIG. 21 is a side schematic representation of a portion of an engine, according to aspects of the present embodiments.

FIG. 21 illustrates a side cross-sectional view of an engine 60 including at least one rotating detonation combustor. The aft looking forward view illustrated in FIG. 20 is taken at cut-line B-B in FIG. 21. The embodiment of FIG. 21 illustrates a lower annulus portion 82 and an upper annulus portion 84, both circularly disposed about the engine centerline 56. The annulus 13 wraps circumferentially within the engine casing 55 while also extending axially aft. The annulus 13 may be fluidly connected to one or more combustor (or actuator) exits 80. The combustor (or actuator) exit 80 divides the annular engine casing 55 into an inner diverging segment 88 and an outer diverging segment 86. The inner and outer diverging segments 88, 86 diverge in a radially outward direction as they transition axially afterward. The inner and outer diverging segments 88, 86 may form the axially aft portions of engine casing 55 and may be colinear with each other. The outer diverging segment 86 may be radially outward and axially aft of the inner diverging segment 88. Axially forward of the inner diverging segment 88, an inner converging segment 90 may be disposed in a radially inward portion of the engine casing 55. The inner converging segment 90 may angle radially inwards as it transitions axially aftward. At the combustor (or actuator) exit 80, combustion gases exit the rotating detonation combustor (or actuator) 2, and may result in a vectored thrust, depending on the circumferential locations at which fuel is injected into the annulus 13, as discussed above.

The annulus 13 may include an axial portion 114 disposed axially upstream and forward of a corner portion 112 which itself is disposed axially forward and radially outward of an angled portion 116. The axial portion 114 may extend substantially axially while the angled portion 116 may extend both axially aftward and radially inward. The corner portion 112 may define a transition between the axial portion 114 and the angled portion 116. As combustion gases exit the annulus 13 at the fluid exit 80, they are oriented at least partially radially inward (as well as both axially aft and circumferentially). By selectively dispersing fuel from at least one fuel injector 27 disposed in at least one of the inner wall 10 and the outer wall 8, the engine 60 may disperse a net thrust vector that is directed in a direction other than an axial direction, according to a desired operating condition.

Each of the embodiments of FIGS. 1-21 may include at least one igniter, at least one radial and/or tangential exit (as well as exits that are partially radially, axially and/or tangentially (i.e., circumferentially) aligned), an annular, cylindrical and/or ring-shaped manifold, at least one manifold exit, as well as other upstream system components such as a fuel supply, an air (or oxidizer) supply, a fuel supply line, an air (or oxidizer) inlet, a fuel control valve, a fuel injector, an airflow (or oxidizer flow) control mechanism, as well as other upstream system components. In addition, each of the embodiments of FIGS. 1-21 structures, surfaces, and components thereof may include and/or require thermal management and/or cooling features in order to prevent excessive temperatures and thermal gradients.

As used herein, "detonation" and "quasi-detonation" may be used interchangeably. Typical embodiments of detonation chambers include a means of igniting a fuel/oxidizer mixture, for example a fuel/air mixture, and a confining chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, autoignition or by another detonation via cross-firing. The geometry of the detonation chamber is such that the pressure rise of the detonation wave expels combustion products out of the detonation chamber exhaust to produce a thrust force, as well as for other purposes such as flow control actuation. In addition, rotating detonation combustors are designed such that a substantially continuous detonation wave is produced and discharged therefrom. Detonation may be accomplished in a number of types of detonation chambers, including detonation tubes, shock tubes, resonating detonation cavities, and annular detonation chambers.

Each of the embodiments disclosed herein include fuel being combusted in the presence of an oxidizer. Fuel mixes with an oxidizer during or prior to the combustion process. The embodiments disclosed herein include air as one possible oxidizer. However, other oxidizers such as straight oxygen (i.e., pure oxygen) are also possible. In various conditions, oxygen may be a preferred oxidizer over air. In other conditions, air may be the preferred oxidizer. As used herein, the terms "oxygen" and "pure oxygen," may include gas that is at least about 80% oxygen by mass. In some embodiments, the oxidizer may be at least about 90% oxygen by mass. In other embodiments, the oxidizer may be about 93% to about 99.3% oxygen by mass. In other embodiments, the oxidizer may be greater than about 99.3% oxygen by mass. (By comparison, air is about 21% oxygen, about 78% nitrogen and about 1% other gases). Other oxidizers other than oxygen and air are also possible. In embodiments other that use an oxidizer other than air, those embodiments will include the corresponding system components including, for example, an oxidizer inlet, an oxidizer supply line, an oxidizer supply, an oxidizer flow control mechanism, an oxidizer flow modulator, and a second oxidizer inlet.

Each of the embodiments disclosed herein include a source of ignition which may be in the form of a spark igniter and/or via autoignition (i.e., via heated inner and outer walls 10, 8 which have absorbed heat from the combustion process) as well as via volumetric ignition. Some embodiments may include multiple sources of ignition. For example, in some embodiments, at least one spark igniter may be used during some operating conditions and then ignition may transition to autoignition and/or volumetric ignition at other operating conditions.

The present embodiments include an aircraft, an engine, a combustor, and/or systems thereof which include rotating detonation combustion. The embodiments presented herein operate on a kilohertz range (1000 Hz to 1000 kHz), which is faster than the 100 Hz operating frequency of previous pulse detonation actuators (PDA) and/or pulse detonation engines (PDE). As such, the embodiments presented herein may provide a more continuous and less pulsed combustion gas jet discharging from the radial exit 48 and/or combustor exit 80 compared to previous pulse detonation actuators (PDA).

The present embodiments offer both high operating frequency and significant control authority which provides benefits in numerous practical applications, such as engine exhaust thrust vectoring for vehicle control or boundary layer separation control for aircraft lift enhancement and drag reduction. The present embodiments may also be used as igniters for engines in supersonic and/or hypersonic applications, for example in scramjet engines. The present embodiments take advantage of the energy dense fuel, and therefore, requires significantly less external air. The present embodiments may be used as the primary combustion system for engines such as gas turbine engines. The present embodiments may be used as the secondary, tertiary, and/or auxiliary combustion systems for engines such as gas turbine engines, and/or other components of an aircraft or of other applications.

Exemplary applications of the present embodiments may include high-speed aircraft, separation control on airfoils, flame holders, flame stability, augmenters, propulsion, flight stability, flight control as well as other uses.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A propulsion system comprising:
at least one rotating detonation actuator comprising:
a flow path extending from an inlet end to an outlet end;
an inner wall defining a radially inner boundary of the flow path; and
an outer wall defining a radially outer boundary of the flow path; and
at least one aircraft wing, wherein the at least one rotating detonation actuator is disposed in the at least one aircraft wing, and
the at least one rotating detonation actuator further comprising:
an upper flow path portion disposed in the at least one aircraft wing;
a lower flow path portion disposed in the at least one aircraft wing below the upper flow path portion, wherein the upper flow path portion and the lower flow path portion collectively define the flow path; and
at least one fuel injector disposed in each of the upper flow path portion and the lower flow path portion, wherein the at least one fuel injector modulates a fuel flow into each of the upper flow path portion and the lower flow path portion resulting in change to the respective velocities of combustion gases exiting from each of the upper flow path portion and the lower flow path portion, and wherein at least one rotating detonation wave travels through the flow path from the inlet end to the outlet end.

2. The propulsion system of claim 1, wherein the at least one rotating detonation actuator modulates aerodynamic lift acting on the at least one aircraft wing.

3. The propulsion system of claim 1, the at least one rotating detonation actuator further comprises multiple rotating detonation actuators disposed in the at least one aircraft wing.

4. The propulsion system of claim 1, wherein a first flow exits the upper flow path portion at a downstream end of the at least one aircraft wing, and wherein a second flow exits the lower flow path portion at a downstream end of the at least one aircraft wing.

5. The propulsion system of claim 1, further comprising at least one wing control surface disposed at a downstream end of the at least one aircraft wing.

6. The propulsion system of claim 5, wherein a first flow exits the upper flow path portion at a downstream end of the at least one aircraft wing, the first flow flowing across an upper surface of the at least one wing control surface, and wherein a second flow exits the lower flow path portion at a downstream end of the at least one aircraft wing, the second flow flowing across a lower surface of the at least one wing control surface.

7. The propulsion system of claim 1, further comprising a mixer coupling disposed at a downstream portion of each of the upper flow path portion and the lower flow path portion.

8. The propulsion system of claim 1, wherein the at least one aircraft wing further comprises at least one rounded trailing edge.

* * * * *